United States Patent [19]

Agius

[11] 4,456,176
[45] Jun. 26, 1984

[54] APPARATUS FOR PROCESSING AND DISPENSING FERTILIZER OR INSECTICIDE

[76] Inventor: Joseph L. Agius, 1778 Spruce, Livermore, Calif. 94550

[21] Appl. No.: 417,475

[22] Filed: Sep. 13, 1982

[51] Int. Cl.³ ............................................... B05B 7/04
[52] U.S. Cl. ....................................... 239/142; 239/310
[58] Field of Search ............... 239/209, 305, 307, 310, 239/142, 124, 69, 70, 127, 332, 416.2, 416.3, 427, 427.5; 137/391, 392

[56] References Cited

U.S. PATENT DOCUMENTS

| | | | |
|---|---|---|---|
| 1,079,721 | 1/1913 | Pungs | 239/310 |
| 3,322,350 | 5/1967 | Heinicke | 239/307 |
| 3,330,290 | 7/1967 | Porter | 239/112 |
| 3,592,254 | 7/1971 | Bauer | 239/70 |
| 3,831,681 | 8/1974 | Livingston | 239/209 |
| 4,265,262 | 5/1981 | Hotine | 137/392 |
| 4,277,026 | 7/1981 | Garvey | 239/142 |

Primary Examiner—Andres Kashnikow
Assistant Examiner—Kevin P. Weldon
Attorney, Agent, or Firm—Alfons Puishes

[57] ABSTRACT

A fertilizer or insecticide storage tank is connected to the top of a solution tank. High pressure water fed into the top of the storage tank forces the chemical from the storage tank into the solution tank; a jet is pumped into the curved bottom of the solution tank at high pressure so that the jet travels upwardly and during the filling of the solution tank it agitates the solution; a drain valve is opened when the solution tank is completely filled, to drain the agitated solution through a pump under high pressure into an irrigation system; controls automatically close the drain valve until the chemical storage tank is empty, and automatically open an air pressure valve to the chemical storage tank for a set period through the chemical storage tank thereby to completely empty it; and when multiple chemical storage tanks are used, then to control through sensors the operation through another fertilizer storage tank as aforesaid whereby continual fertilizer operation can be automatically accomplished.

6 Claims, 3 Drawing Figures

APPARATUS FOR PROCESSING AND DISPENSING FERTILIZER OR INSECTICIDE

THE STATE OF THE ART

In previous practice in nurseries and small applications, the fertilizer or insecticide was placed either in the form of powder or granule in canisters and poured into a garbage can and water added and manually stirred. In larger operations at present the chemical is dispersed from a duster airplane. Chemicals used are generally not water soluble and must be held in suspension.

Several suggestions were made in some prior patents for connection of a chemical applicator to an irrigation system such as mixing water with chemicals at about the area of introduction where the water into the irrigation system or dripping or liquid dung is discharged through an aspirator pipe; or in a rather complex form dispensing water and chemical together; or sprinkling water on chemical within a tank and then pumping into the sprinkling system. These and similar efforts would not accomplish a complete dispersion of the chemical so that it is held in suspension in the liquid such as water, and which is readily controlled automatically for the purpose of achieving uniform and thorough distribution through a sprinkling or irrigation system, by continual operation. Prior art is set forth and appended hereto, and discussed below.

U.S. Pat. No. 1,862,238 to Roe is adapted to the furrow or ditch type of irrigation. Water is drawn from a ditch by means of a pump into a tank from which it is caused to flow into a container having within it a water soluble fertilizer. The water flow is float controlled and dissolves the fertilizer which then flows out of the container into the irrigation ditches or furrows. It is manually controlled.

Sellati U.S. Pat. No. 2,944,561 is a water tank containing fertilizer and sprinkler head within it for dissolving the fertilizer and is connected to a lawn sprinkler system through a suitable control valve.

Friedmann U.S. Pat. No. 2,757,047. Liquid dung and water are mixed in a tank and removed by an ejector and then mixed with water from a pump and supplied to irrigating pipe and nozzle to suitable flow control by throttle valve in irrigating line. Control valve regulates volume of manure and water mix.

Cirese U.S. Pat. No. 2,760,820 for water soluble chemicals utilizes a novel mixing chamber containing a manifold and baffle. The chemical is introduced and then the turbulence caused by water under pressure flowing out of the manifold against the baffle aides in the solution before distribution of the dissolved chemical, either fertilizer or insecticide.

U.S. Pat. No. 3,171,427 to McAlpine. This utilizes a tank with bulk chemical dissolved therein and a venturi ejector is connected to the top of the tank and discharges to fluid consuming load. Treated water only is fed to tank to mix with chemical as water operated venturi sucks fluid out of tank to the area to be irrigated. Raw water is kept away from chemicals and only treated water is used.

U.S. Pat. No. 3,414,163 to Gaddis. A rotating mechanical feeder feeds dry material from a bin into a mixing tank where it is mixed with filtered liquid. The rotating mechanical feeder acts as a proportioner which is electrically controlled by the water flow. From the mixing tank it is pumped to the area to be irrigated. There is no provision for maintaining the material which may be insoluble in suspension.

U.S. Pat. No. 3,726,304 to Cook. A tank has a bladder lining into which liquid fertilizer is pumped. Controlled water under pressure applied to space between bladder and tank causing constant volume of fertilizer to enter into irrigation system supply pipe.

U.S. Pat. No. 3,968,932 to Kimmell. A tubular conduit is connected into a conventional irrigation line. The container is connected to this tubular conduit, the container containing the chemicals and equipped with spray for solution and mixing. Mixing nozzle located in the conduit dispenses the dissolved chemical in the water flow to the area for use.

The primary object of the herein invention is to provide an apparatus which is capable of complete dispersion of the chemical in the liquid so that the small particles of the chemical are held in suspension in liquid continually during the dispensing operation.

Particularly it is an object of the invention to provide a transmittal of the chemical into a solution tak agitated throughout the operation of the apparatus whereby the chemical in complete suspension in the liquid is fed into a sprinkling or irrigation system, and which is capable to be combined in multiple units for sequential operation, thereby to assure continual dispersion during irrigation or sprinkling.

DETAILED DESCRIPTION

Figure 1:
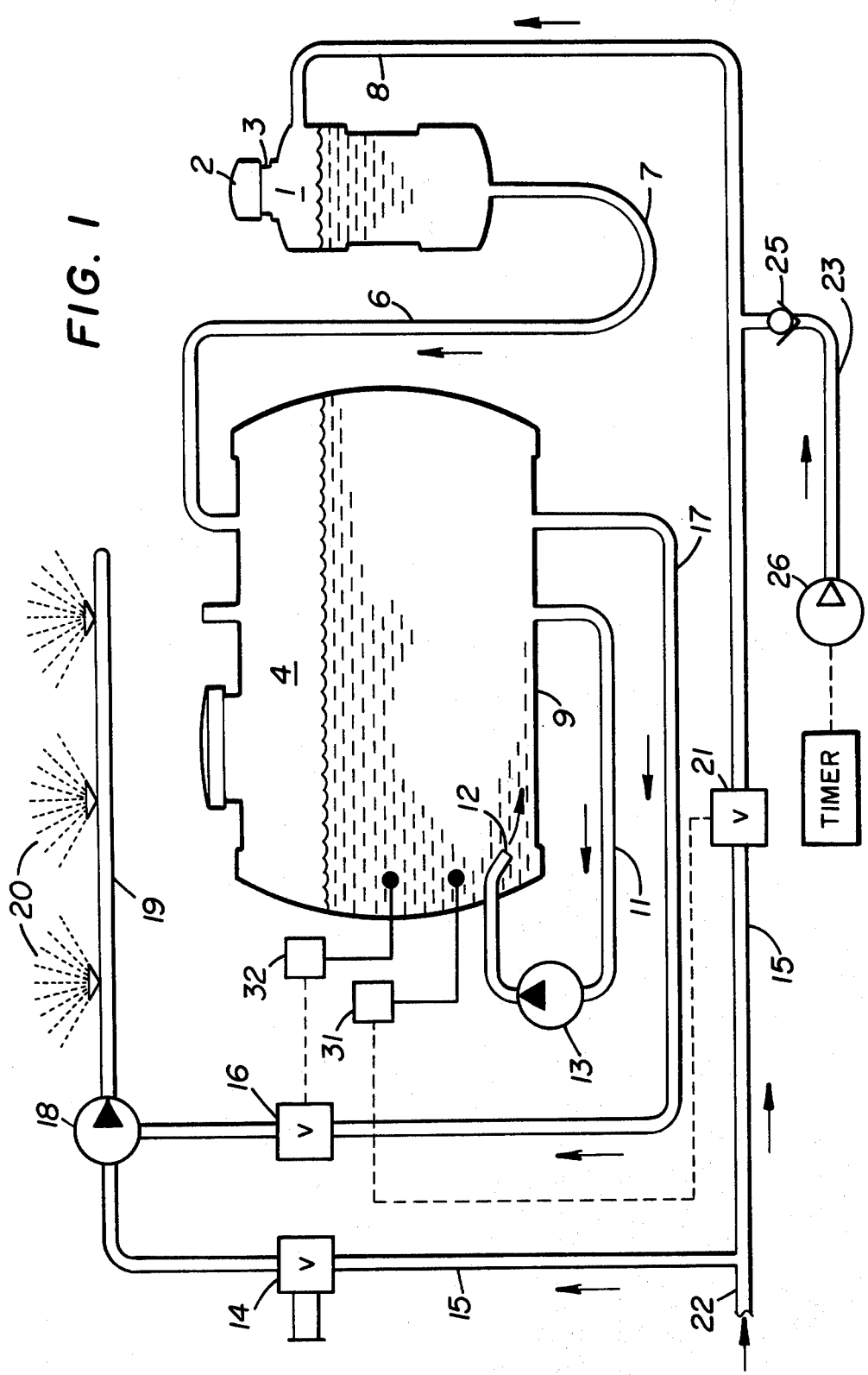
FIG. 1 is a flow diagram illustrating the arrangement and operation of the components comprising my apparatus and system.

The chemical pressure tank 1 has a removable top cover 2 over an intake 3 through which the powdered chemical is introduced in a predetermined amount proportioned to the capacity of a solution tank 4 in a desirable ratio. An outlet conduit 6 extends from the bottom of the chemical tank 1 to the top of the vented solution tank 4. The conduit 6 is so shaped as to form a trap 7 below the bottom of the chemical tank 1.

A fresh water intake conduit 8 is connected to the upper portion of the chemical tank 1 near the top thereof through which water under pressure is forced through the chemical tank 1 so as to form an initial mixture of chemical and water. This initial mixture is forced through the outlet conduit 6 to the top of the vented solution tank 4.

The solution tank 4 has a curved bottom 9. A by-pass conduit 11 is connected to the lower portion of the curved bottom 9, and feeds into a nozzle 12. A water circulating centrifugal pump 13 is interconnected in the by-pass conduit 11 so as to by-pass the solution from the curved bottom 9 and then force the by-passed water through the nozzle 12 in the form of a jet. The nozzle 12 is substantially tangential to a side of the curved bottom 9 at such an angle that a jet formed under pressure by the water issuing therefrom circulates substantially spirally upward creating currents for intimately intermixing the solution whereby small particles of chemical are kept in suspension in the solution.

Solenoid operated valve 16 is in outlet conduit 17 leading from the curved bottom 9 of the solution tank 4 to an injection and mixing pump 18 which forces the solution into a discharge conduit 19 to the sprinking system 20 of the irrigation system. The pump 18 may be water driven such as that manufactured by Smith Precision Products Co. and set for a ratio of approximately 100 to 1 in appropriate cases.

In the fresh water intake conduit 15 is connected an intake valve 21 also solenoid operated, through which fresh water is forced under high pressure by a high pressure water supply 22.

An air intake conduit 23 which may be part of pipeline 8, leads to the top of the fertilizer pressure tank 1. An air check valve 25 controls the flow of air through the conduit 23 from a compressor 26, for blowing all residue out of the fertilizer pressure tank 1 before refilling.

Pressure sensors 31 and 32 connected at the bottom 9 of the solution tank 4, control the injection drain valve 16. As long as the pressure in the solution tank 4 is low, the top sensor 31 operates to keep the outlet or drain valve 16 closed until the solution tank is entirely filled. The sensor 32 opens valve 16 for discharging the solution to the sprinkler or distribution system, through injection drain pump 18, when operated manually or by automatic sprinkler timer. As the pressure is reduced, the top sensor 31 closes the drain valve until the solution tank 3 is completely filled again. These sensors may be of a type manufactured by United Electric Controls as pressure response switches.

The operation of a single tank unit is as follows: The required amount of chemical is manually placed in the chemical pressure tank 1, then the top cover 2 is tightened on the intake 3. The air compressor 26 is inoperative. Then the water intake valve 21 is opened and high pressure water supply is introduced through the chemical tank 1 at the top and forces the water and chemical through the conduit 6 to the solution tank 4. The drain or outlet valve 16 is closed.

Figure 2:
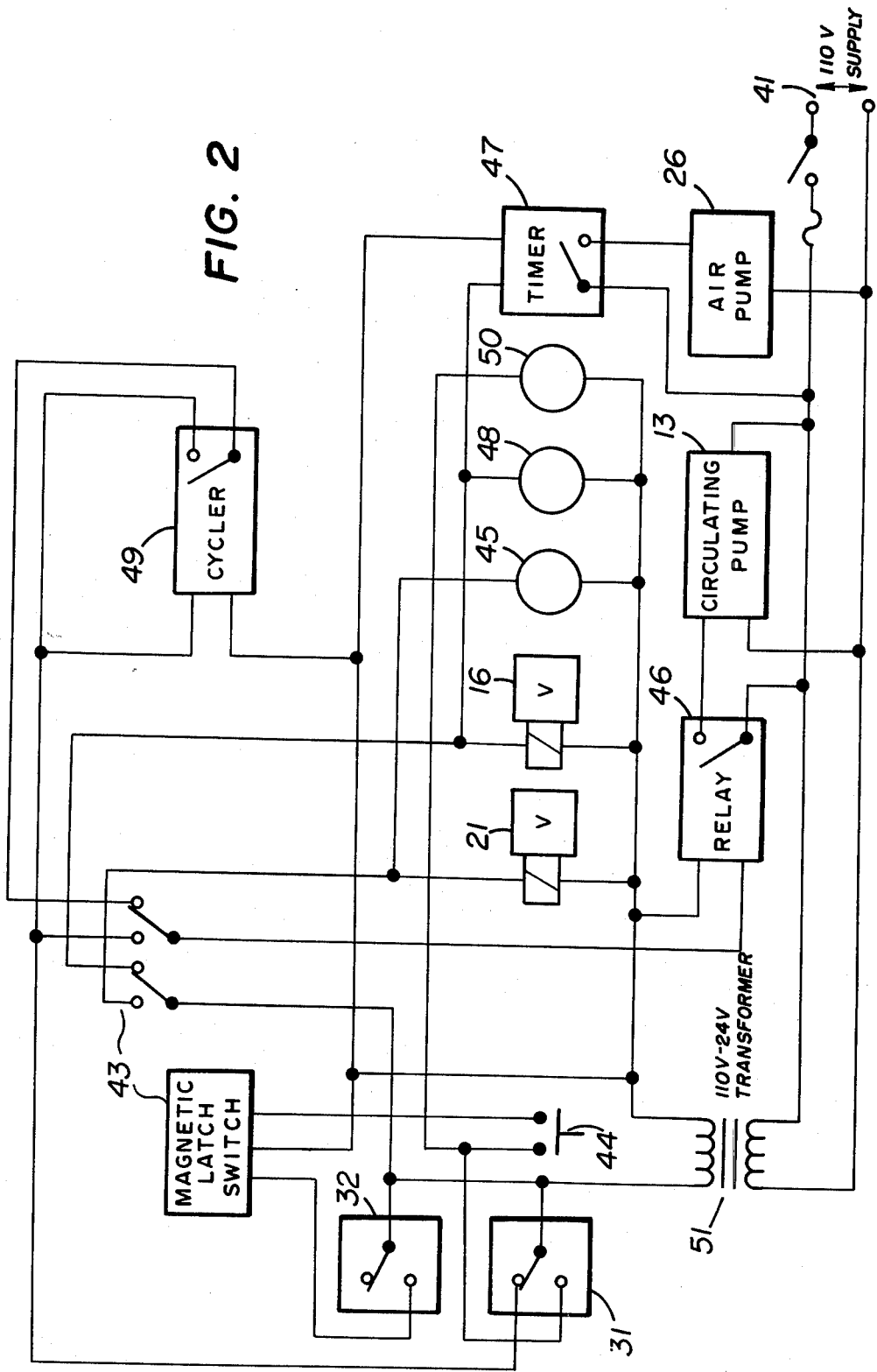
FIG. 2 is the wiring diagram illustrating the automatic electrical operation of the components.

The valve, pump and relay operations may be best seen by a study of the wiring diagram FIG. 2 in connection with the flow diagram of FIG. 1. Thus the sequence is as follows, referring also to FIG. 2.

The chemical storage tank 1 is now full of the predetermined amount of chemical and the chemical solution and mixing tank is empty. Start switch 44 is closed, energizing low level control 32 and a magnetic latch relay 43. This serves to open supply valve 21 which is indicated on light 45 and closes drain valve 16. This permits forcing of chemical from tank 1 into tank 4. At the same time, solid state relay 46 operates to start circulating pump 13 whose action is to aid in dispersing the chemical flowing into tank 4.

When a predetermined level is reached, upper limit control 31 closes operating magnetic latch relay 43 to what amounts to a reset position. This causes closing of water supply valve 21 and opening of drain valve 16 as well as actuating solid state timer 47 and starting operation of air pump 26 to effect complete emptying of tank 1.

At this point, ready indicating light 48 is turned on as well as solid state cycler 49 which provides intermittent operation to circulating pump 13.

The suspension of chemical flows through drain line 17 to mixing pump 18 where it meets with main water supply from manually or automatically operated valve 14, is properly proportioned and fed to line 19 which in turn supplies irrigation system 20.

When the liquid level in tank 4 reaches a predetermined level as governed by lower level control 32, this switch closes and lights up empty indicator 50. Chemical storage tank 1 must then be refilled and the cycle repeated.

I have found that solution tank 4 of 100 gallons to be satisfactory and a 25 pound mix of chemical in tank 1 with a 100 to 1 ratio of mix to be satisfactory for most operations. A circulating pump 13 having a capacity of 30 GPM with a cycle of 15 minutes on and 15 minutes off I have found to work well.

All valves except 14 are solenoid operated through a central panel (not shown, except diagramatically on FIG. 3.) on which the indicating lights, relays, timer and cycler are also mounted. The 110 volt power supply is seen at 41 and 110 to 24 volt transformer at 51.

Figure 3:
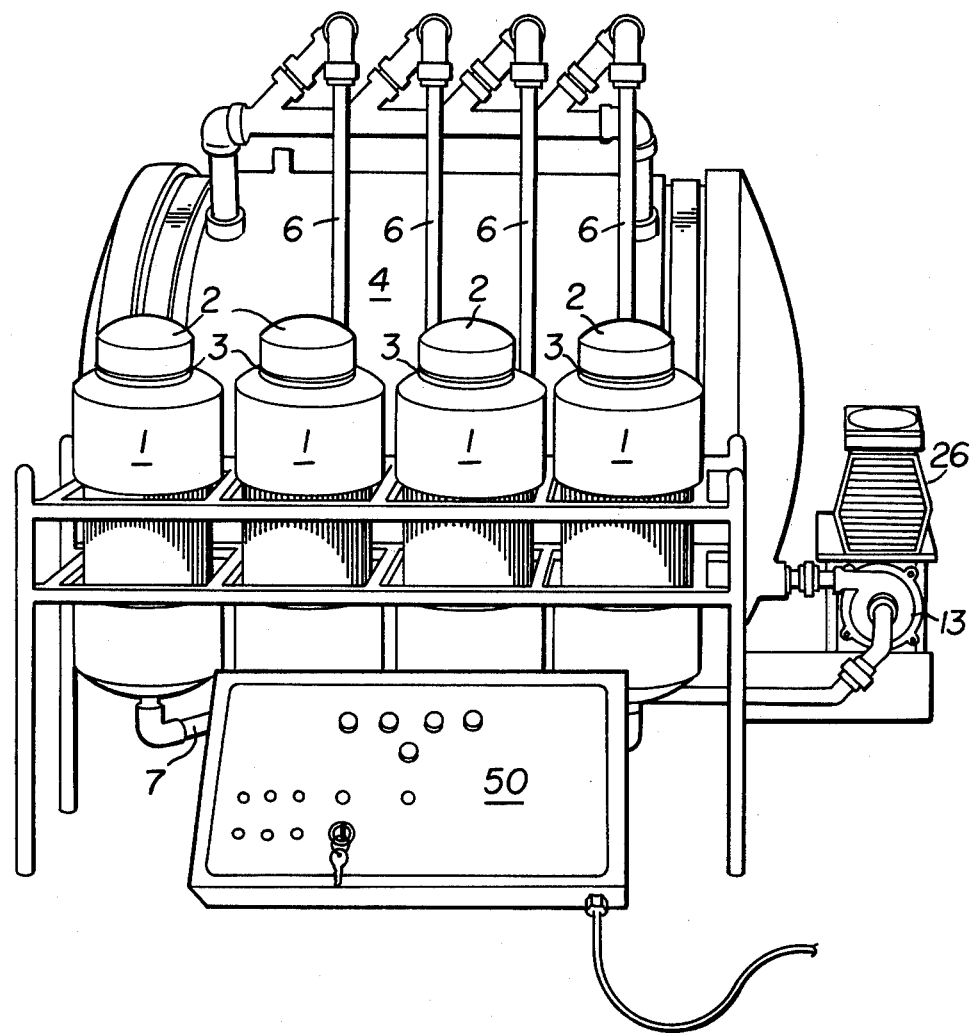
FIG. 3 is a partial elevation of my apparatus as it appears when a plurality of chemical tanks is used.

For larger scale and more continuous operation I may manifold several storage tanks 1 to connect to solution tank 4 as shown partially on FIG. 3. Here I use a control panel 50 which is equipped to also automatically cut out empty storage tanks and cut in successive full ones as their condition is indicated on the panel shown. The individual steps in operation of each tank are the same as described above for the single unit.

It is seen from the above description that I have provided a method of mixing a chemical, either insecticide or fertilizing, which may not be soluble in water and keep it in suspension while it is being mixed with the bulk of the irrigation water and proportioned therewith. I have also shown how my system can be proved to effect continuous operation by using a multiple of chemical supply tanks interconnected to the basic system which is illustrated above.

I claim:

1. An apparatus for mixing and dispensing a powdered or particulate chemical compound comprising:
   a pressure vessel of predetermined capacity having access means through a top opening for receiving said compound;
   a mix tank;
   the bottom of said vessel being connected through suitable piping to the top of said mix tank;
   a source of raw water under pressure connected to the top of said vessel by a suitable pipeline;
   a first solenoid operated stop valve in said pipeline;
   a first outlet pipe connected from the bottom of said tank to an electrically driven circulating pump;
   said circulating pump having a discharge connected back to said mix tank;
   a mixing nozzle positioned on the outlet end of said discharge within said mix tank;
   a second outlet pipe connected from the bottom of said mix tank to a mixing pump;
   a second solenoid operated stop valve in said second outlet pipe;
   a first pressure sensing switch connected to said mix tank and being responsive to a low level of water in said tank;
   a second pressure sensing switch connected to said mix tank and being responsive to a high level of water in said mix tank;
   said first switch being disposed to energize and open said first solenoid valve when the water level in said mix tank reaches a predetermined low level and close at a predetermined high level;

said second switch being disposed to energize and open said second solenoid valve when the said water level reaches a predetermined high level and close at a predetermined low level;

said source of raw water under pressure being connected to said mixing pump through a manually operated stop valve;

the discharge of said mixing pump being connected to a water distribution system;

an electrical power supply source to said electrical equipment;

an electrically driven compressor;

said electrically driven compressor being connected to discharge air under pressure into said pressure vessel;

said electrically driven compressor being supplied with driving power from said source through an electrical timer;

said timer being energized to operate said compressor intermittently for a predetermined period when said water level is at a predetermined high level in said mix tank;

whereby any remaining chemical in said vessel is discharged into said mix tank.

2. The apparatus of claim 1 in which said electrically driven circulating pump is supplied by said power source through an electrical cycle which provides intermittent operation of said pump.

3. The apparatus of claim 1 in which said mixing pump is disposed to function as a proportioning device to control the ratio of water discharged from said mix tank and the water from said source of raw water under pressure connected to said mixing pump.

4. The apparatus of claim 1 which said distribution system comprises an overhead sprinkler system.

5. The apparatus of claim 1 in which a plurality of pressure vessels are manifolded to communicate with said mix tank and a control system whereby each of said vessels may be opened in turn to said mix tank when the preceding vessel is empty.

6. The apparatus of claim 5 including an electrical panel board said panel board having mounted upon it suitable connections to said power supply and to said solenoid valves, said air compressor and said circulating pump and said controls and having indicating lights thereon to indicate when said water level in said mix tank is at its predetermined upper and lower levels.

* * * * *